US011631842B2

(12) United States Patent
Lee et al.

(10) Patent No.: US 11,631,842 B2
(45) Date of Patent: Apr. 18, 2023

(54) POROUS CARBON, AND POSITIVE ELECTRODE AND LITHIUM SECONDARY BATTERY COMPRISING SAME

(71) Applicants: LG ENERGY SOLUTION, LTD., Seoul (KR); POSTECH ACADEMY-INDUSTRY FOUNDATION, Pohang-si (KR)

(72) Inventors: Dongwook Lee, Daejeon (KR); Changshin Jo, Busan (KR); Jinwoo Lee, Pohang-si (KR); Kwonnam Sohn, Daejeon (KR); Doo Kyung Yang, Daejeon (KR); Won-Gwang Lim, Pohang-si (KR)

(73) Assignees: LG ENERGY SOLUTION, LTD., Seoul (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 17/745,172

(22) Filed: May 16, 2022

(65) Prior Publication Data
US 2022/0278311 A1     Sep. 1, 2022

Related U.S. Application Data

(63) Continuation of application No. 16/646,473, filed as application No. PCT/KR2018/012440 on Oct. 19, 2018, now Pat. No. 11,367,866.

(30) Foreign Application Priority Data

Nov. 8, 2017 (KR) .................. 10-2017-0147765

(51) Int. Cl.
*H01M 4/02* (2006.01)
*H01M 4/36* (2006.01)
(Continued)

(52) U.S. Cl.
CPC ............ *H01M 4/362* (2013.01); *C01B 32/05* (2017.08); *H01M 4/38* (2013.01); *H01M 4/625* (2013.01);
(Continued)

(58) Field of Classification Search
CPC ...................................... H01M 4/02
See application file for complete search history.

(56) References Cited

U.S. PATENT DOCUMENTS 6,585,948 B1    7/2003  Ryoo et al.
6,812,187 B1   11/2004  Pak et al.
(Continued)

FOREIGN PATENT DOCUMENTS

CN    102903887 A    1/2013
CN    103569995 A    2/2014
(Continued)

OTHER PUBLICATIONS

Choi et al., "Polymer-coated spherical mesoporous silica for pH-controlled delivery of insulin," Journal of Materials Chemistry B, vol. 2, 2014, pp. 616-619.
(Continued)

*Primary Examiner* — Jacob B Marks
(74) *Attorney, Agent, or Firm* — Birch, Stewart, Kolasch & Birch, LLP

(57) ABSTRACT

Porous carbon particles, and a positive electrode active material and a lithium secondary battery including the same. This may improve the energy density of the lithium secondary battery by applying a porous electrode containing micropores and mesopores and having a uniform size distribution and shape as a positive electrode material.

15 Claims, 9 Drawing Sheets

(51) Int. Cl.
*C01B 32/05* (2017.01)
*H01M 4/38* (2006.01)
*H01M 4/62* (2006.01)
*H01M 10/0525* (2010.01)

(52) U.S. Cl.
CPC ..... *H01M 10/0525* (2013.01); *C01P 2004/32* (2013.01); *C01P 2004/61* (2013.01); *C01P 2006/12* (2013.01); *C01P 2006/14* (2013.01); *C01P 2006/17* (2013.01); *C01P 2006/40* (2013.01); *H01M 2004/021* (2013.01); *H01M 2004/028* (2013.01)

(56) References Cited

U.S. PATENT DOCUMENTS

| | | |
|---|---|---|
| 2002/0187896 A1 | 12/2002 | Ryoo et al. |
| 2011/0082024 A1 | 4/2011 | Liu et al. |
| 2012/0178974 A1 | 7/2012 | Zhang et al. |
| 2014/0118884 A1 | 5/2014 | Lin et al. |
| 2015/0357637 A1 | 12/2015 | Yamanoi et al. |
| 2016/0326000 A1* | 11/2016 | Yoon ............ H01G 11/86 |
| 2017/0110719 A1 | 4/2017 | Wang et al. |
| 2017/0317340 A1 | 11/2017 | Nishikawa |
| 2018/0175375 A1 | 6/2018 | Lecuyer et al. |
| 2018/0294475 A1 | 10/2018 | Zhamu et al. |
| 2019/0127528 A1 | 5/2019 | Astafyeva et al. |

FOREIGN PATENT DOCUMENTS

| | | |
|---|---|---|
| FR | 3 050 208 A1 | 10/2017 |
| JP | 2003-34516 A | 2/2003 |
| JP | 2007-8790 A | 1/2007 |
| JP | 2007-197305 A | 8/2007 |
| JP | 2011-525468 A | 9/2011 |
| JP | 2013-508148 A | 3/2013 |
| JP | 2013-125697 A | 6/2013 |
| JP | 2013-254620 A | 12/2013 |
| KR | 10-2001-0001127 A | 1/2001 |
| KR | 10-2004-0073119 A | 8/2004 |
| KR | 10-2013-0098234 A | 9/2013 |
| KR | 10-2016-0061033 A | 5/2016 |
| KR | 10-2016-0145605 A | 12/2016 |
| KR | 10-2017-0003534 A | 1/2017 |
| WO | WO 2014/080230 A1 | 5/2014 |
| WO | WO 2014/112401 A | 7/2014 |
| WO | WO 2016/075916 A | 5/2016 |

OTHER PUBLICATIONS

Extended European Search Report, dated Jun. 19, 2020 for European Application No. 18876053.2.
Han et al., "Spherical Siliceous Mesocellular Foam Particles for High-Speed Size Exclusion Chromatography," Chem. Mater., vol. 19, 2007, pp. 2292-2298.
International Search Report (PCT/ISA/210) issued in PCT/KR2018/012440, dated Apr. 11, 2019.
Kim et al., "Effects of PVP and KCl concentrations on the synthesis of gold nanoparticles using a solution plasma processing," Materials Letters, vol. 62, 2008, pp. 4354-4356.
Sahore et al., "Design Principles for Optimum Perfrormance of Porous Carbons in Lithium-Sulfer Batteries," Advanced Energy Materials, vol. 6, Issue 14, 2016, pp. 1-9 (43 pages total), 1600134, including manuscript.
Cai et al., "Reactive-Template Induced in-situ Hypercrosslinking Procedure to Hierarchical Porous Polymer and Carbon Materials," Acta Chimica Sinica, vol. 73, 2015, pp. 600-604, with an English abstract.
Lu et al., "Synthesis of porous carbon nanotubes/activated carbon composite spheres and their application for vitamin B12 adsorption," Science and Engineering of Composite Materials, vol. 21. No. 2, 2014, pp. 165-171.

* cited by examiner

[Figure 1a]
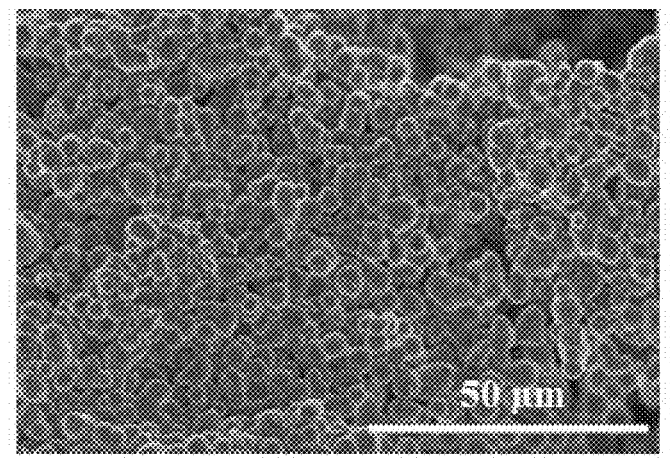
[Figure 1b]
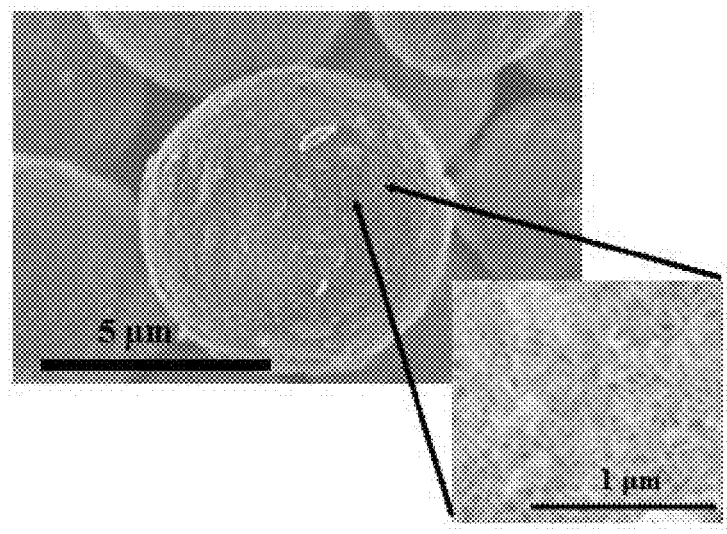

[Figure 2a]
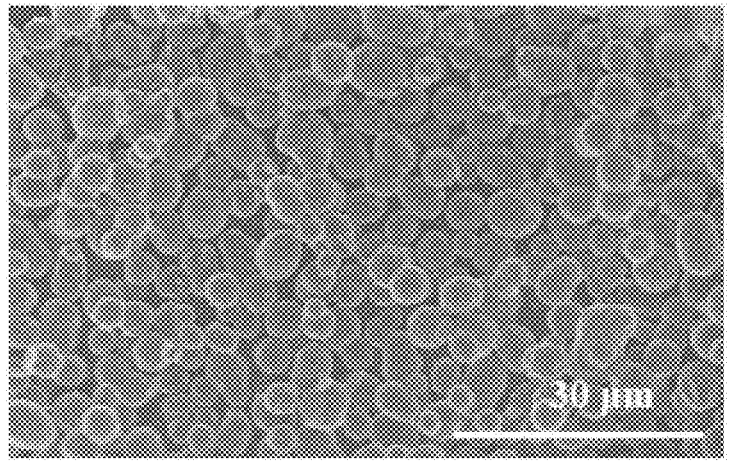
[Figure 2b]
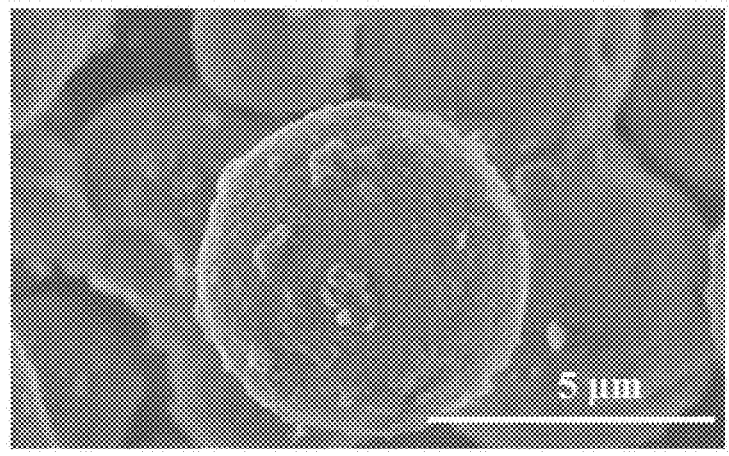
[Figure 2c]
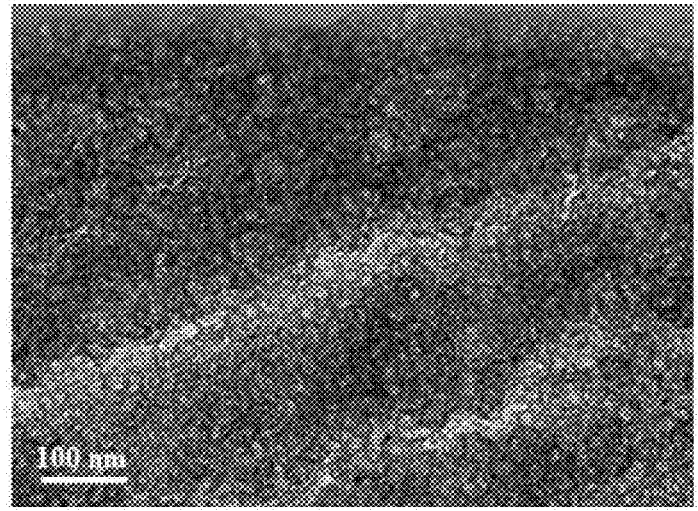

[Figure 3a]
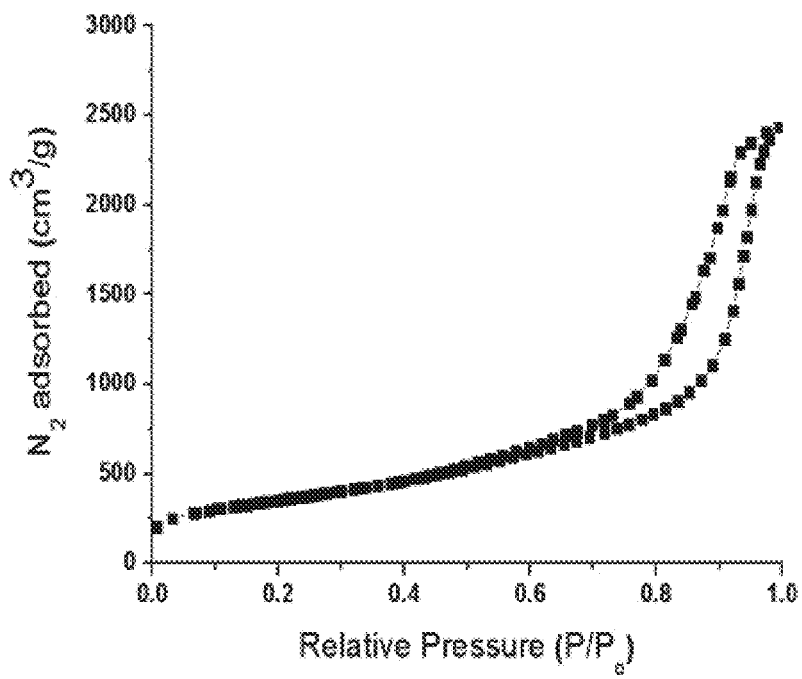
Isotherm linear plot
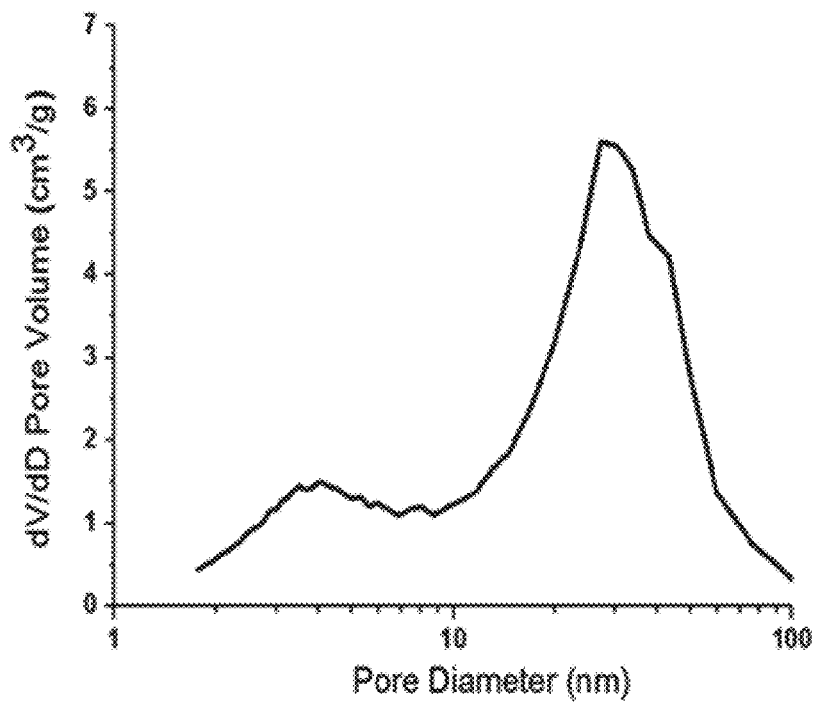
Pore size distribution

[Figure 3b]
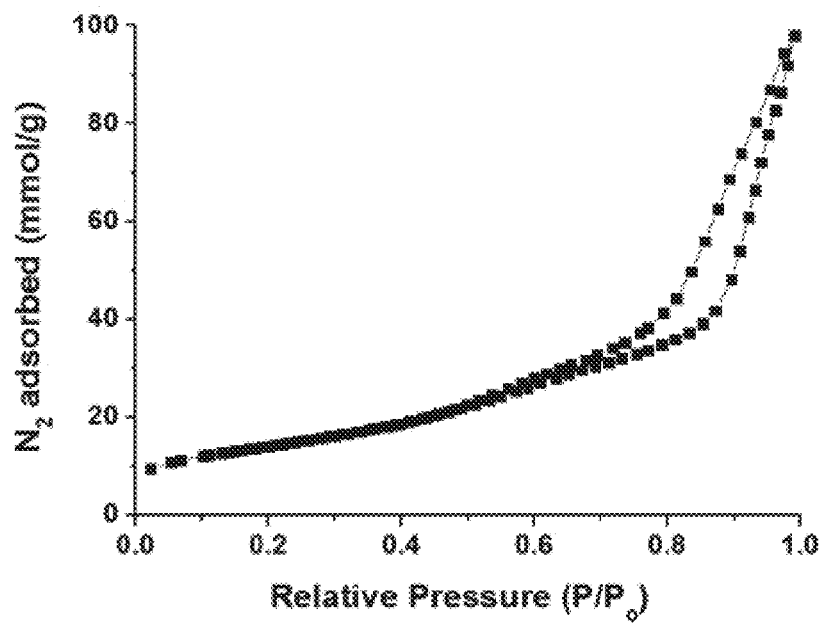
Isotherm linear plot
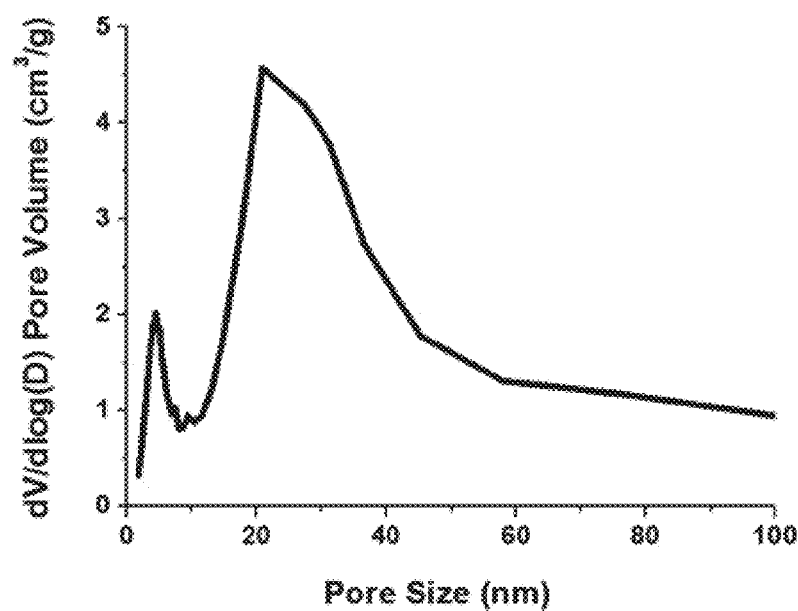
Pore size distribution

[Figure 3c]
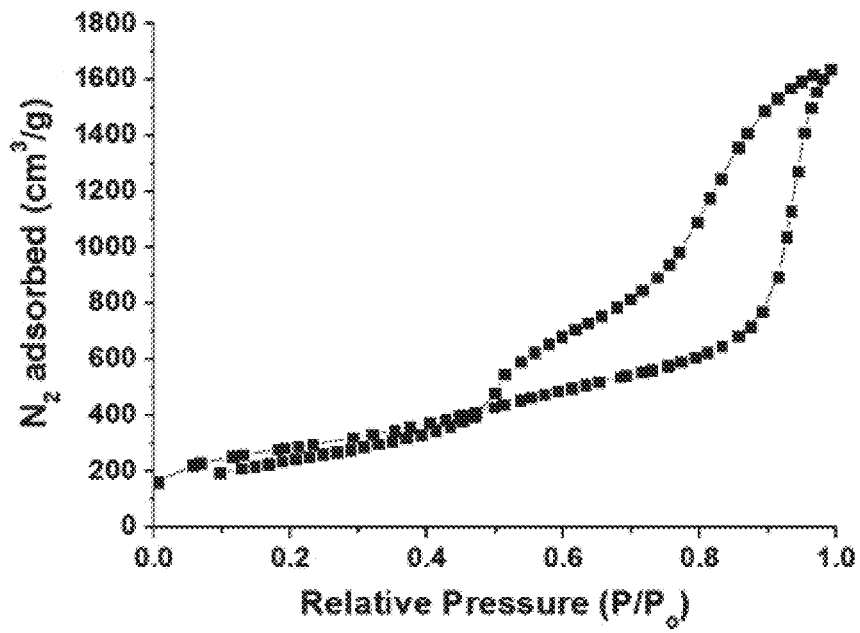
Isotherm linear plot
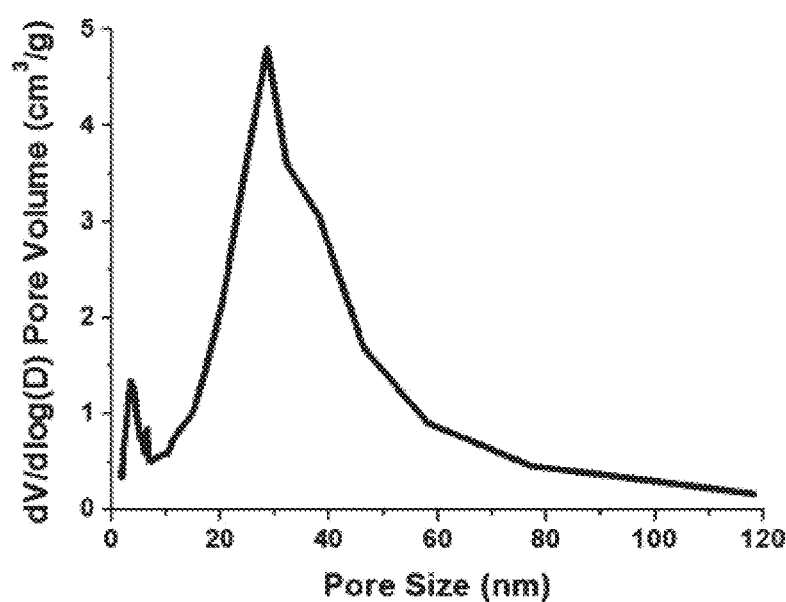
Pore size distribution

[Figure 3d]
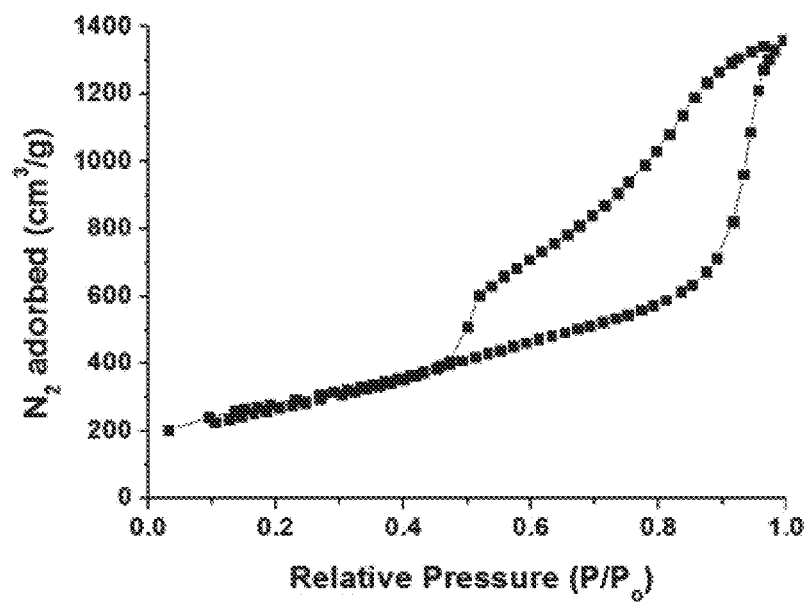
Isotherm linear plot
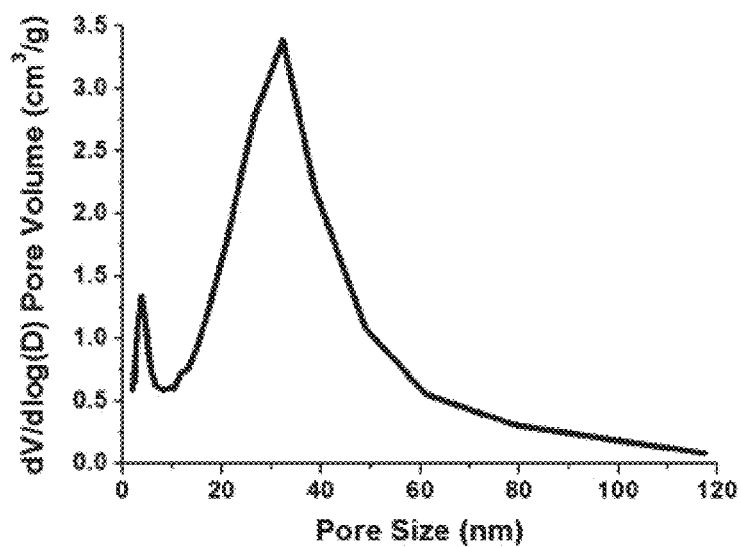
Pore size distribution

[Figure 3e]
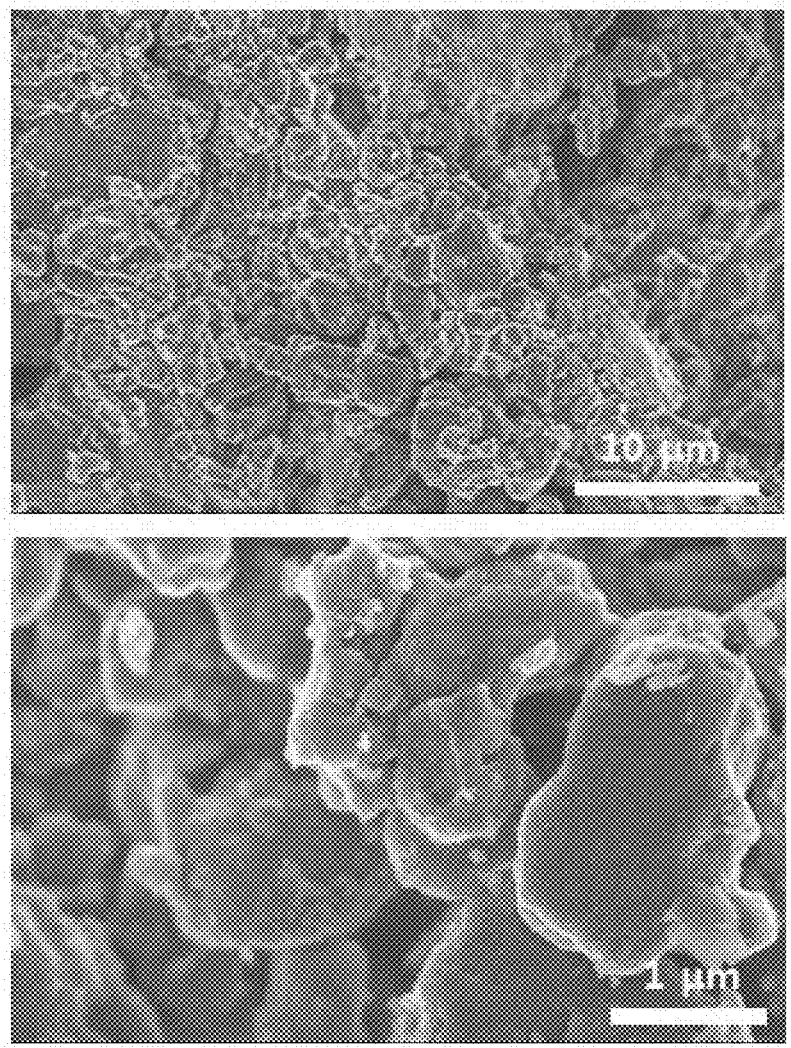

[Figure 4]
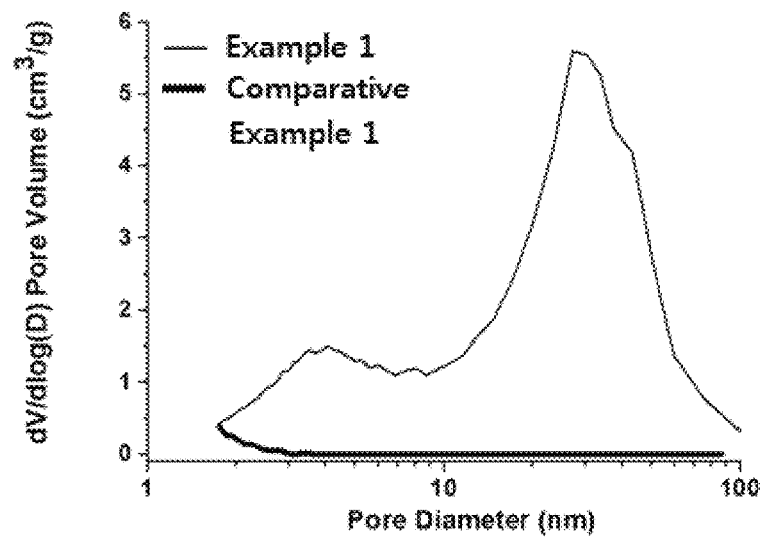
[Figure 5]
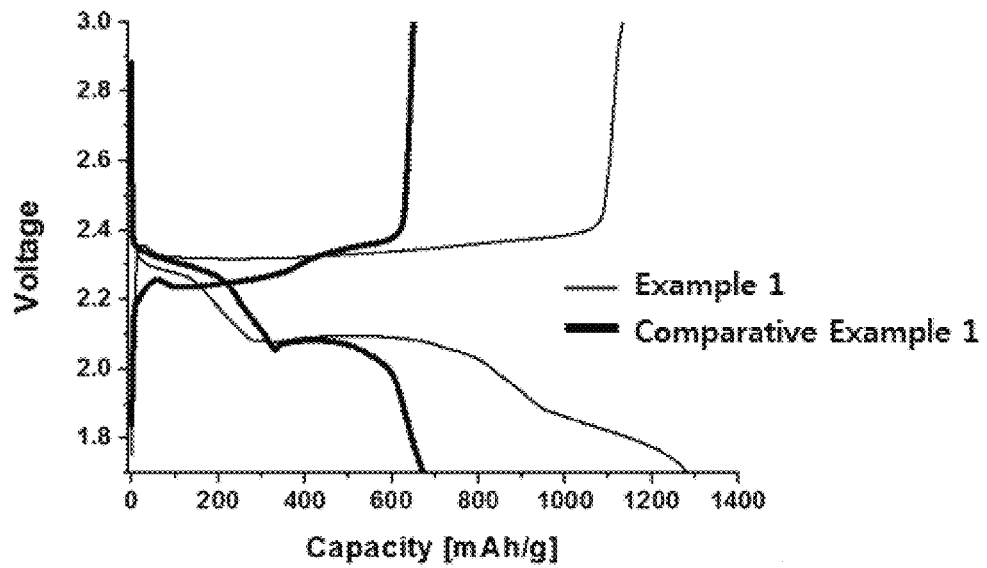

[Figure 6]
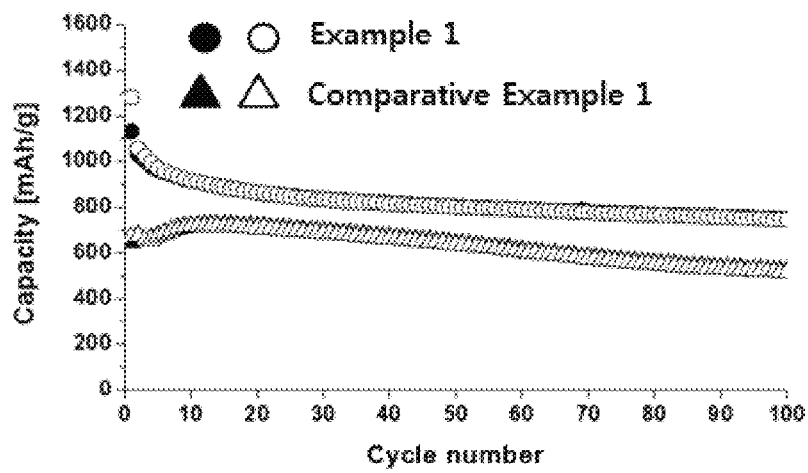
[Figure 7]
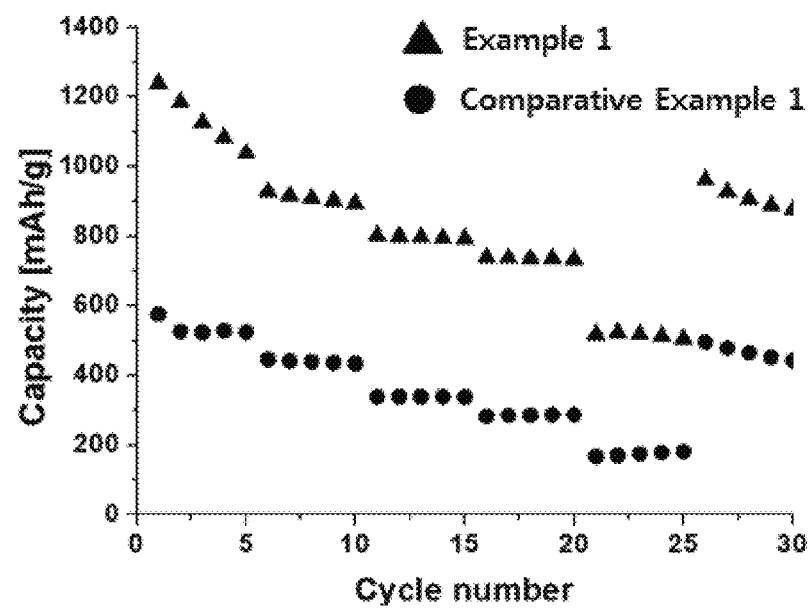

POROUS CARBON, AND POSITIVE ELECTRODE AND LITHIUM SECONDARY BATTERY COMPRISING SAME

CROSS-REFERENCE TO RELATED APPLICATIONS

This application is a Continuation of U.S. application Ser. No. 16/646,473, filed on Mar. 11, 2020, which is the U.S. National Phase under 35 U.S.C. § 371 of International Application No. PCT/KR2018/012440, filed on Oct. 19, 2018, which claims the priority under 35 U.S.C. § 119(a) to Korean Application No. 10-2017-0147765, filed on Nov. 8, 2017, all of which are hereby expressly incorporated by reference into the present application.

TECHNICAL FIELD

The present application claims the benefit of Korean Patent Application No. 10-2017-0147765 filed on Nov. 8, 2017, all the contents of which are incorporated herein by reference.

The present invention relates to a porous carbon capable of improving the energy density of a battery by acting as a sulfur carrier in a positive electrode of a lithium secondary battery, for example, a lithium-sulfur secondary battery, and a positive electrode and a lithium secondary battery comprising the same.

BACKGROUND ART

The present invention relates to porous carbon, and a positive electrode active material, and a lithium secondary battery comprising the same. More specifically, the present invention can improve the energy density of the lithium secondary battery by applying a porous electrode containing micropores and mesopores and having a uniform size distribution and shape as a positive electrode material.

Until a recent date, there has been considerable interest in developing batteries with high energy densities using lithium as a negative electrode. For example, as compared to other electrochemical systems with a lithium inserted carbon negative electrode and a nickel or cadmium electrode that reduce the energy density of the battery by increasing the weight and volume of the negative electrode due to the presence of the non-electroactive material, since lithium metal has low weight and high capacity characteristics, lithium metal has attracted much attention as a negative electrode active material for electrochemical batteries. Lithium metal negative electrode, or negative electrodes, which mainly comprise lithium metal, provide the opportunity to construct a battery that is lighter and has a higher energy density than the battery such as a lithium-ion, nickel metal hydride or nickel-cadmium battery. These features are highly desirable for batteries for portable electronic devices, such as cell phones and lap-top computers, where premiums are paid with low weighted value.

Positive electrode active materials of these types for lithium batteries are known and comprise a sulfur-containing positive electrode active material containing a sulfur-sulfide bond, and achieve high energy capacity and rechargeability from electrochemical cleavage (reduction) and reforming (oxidation) of sulfur-sulfur bonds.

Since there are advantages that the lithium-sulfur secondary battery using lithium and alkali metal as a negative electrode active material and sulfur as a positive electrode active material as described above has theoretical energy density of 2,800 Wh/kg and theoretical capacity of sulfur of 1,675 mAh/g, which is much higher than other battery systems, and sulfur is rich in resources, is cheap and is an environmentally friendly substance, the lithium-sulfur secondary battery is attracting attention as a portable electronic device.

However, there were problems that since sulfur used as a positive electrode active material of the lithium-sulfur secondary battery is nonconductor, it is difficult to transfer electrons generated by electrochemical reaction and that the life characteristics and rate characteristics of the battery are inhibited due to the leaching issue of poly sulfide ($Li_2S_8$~$Li_2S_4$) during charging/discharging and the slow kinetic of electrochemical reactions by the low electrical conductivity of sulfur and lithium sulfide ($Li_2S_2$/$Li_2S$).

In this regard, recently, in order to solve the leaching issue of poly sulfide during charging/discharging of the lithium-sulfur secondary battery and the low electrical conductivity of sulfur and lithium sulfide, a carbon material of the porous structure with high electrical conductivity is used as a sulfur carrier.

Japanese Laid-open Patent Publication No. 2013-125697 discloses a porous carbon having a pore, which is a conductive material that can be compounded with an active material as an electrode material. The porous carbon can be compounded with a compound containing sulfur and/or sulfur atom, and is capable of improving the electron conductivity of the electrode material. Specifically, the pore capacity of the conductive material is 0.5 cc/g or more and 4.0 g/cc or less, the pore diameter is 100 nm or less, and the particle diameter of the conductive material is 1 nm or more and 500 μm or less.

There have been many reports on the application of such porous carbon in conventional lithium-sulfur secondary batteries, but there is still a limit to the improvement of energy density per unit volume and unit volume.

PRIOR ART DOCUMENT

Patent Document

Japanese Laid-open Patent Publication No. 2013-125697, "Composition, electrode and battery comprising lithium particles."

DISCLOSURE

Technical Problem

As a result of various studies to solve the above problems, the inventors of the present invention have found that the specific surface area of a porous carbon is maintained at a level equal to or greater than that of the conventional porous carbon while increasing the overall pore volume and improving the battery performance, by preparing the porous carbon which may act as a sulfur carrier in a positive electrode of a lithium-sulfur secondary battery wherein the porous carbon is prepared to have a mixed pore structure of micropores and mesopores and a uniform particle shape and size.

Therefore, it is an object of the present invention to provide a porous carbon which may be used as a sulfur carrier in a positive electrode of a lithium-sulfur secondary battery and a method for preparing the same.

Also, it is another object of the present invention to provide a positive electrode active material comprising the porous carbon and a method of preparing the same.

Also, it is further another object of the present invention to provide a lithium secondary battery comprising such a positive electrode active material.

Technical Solution

In order to achieve the above objects, the present invention provides a porous carbon comprising micropores having a diameter of 1 nm to 8 nm and mesopores having a diameter of 20 nm to 40 nm wherein the porous carbon is a spherical particle having a particle diameter of 2 μm to 10 μm.

The porous carbon may comprise the micropores and the mesopores in a pore volume ratio of 1:40 to 50.

The volume of the mesopores may be 3.5 $cm^2$/g and more.

The porous carbon may have a specific surface area of 1000 $cm^2$/g to 1300 $cm^2$/g.

The present invention also provides a method for preparing the porous carbon comprising the steps of: (S1) dissolving porous silica in an organic solvent and mixing with a hydrate for introducing an Al acid site to prepare a solution of the porous silica; (S2) evaporating an organic solvent in the porous silica solution to obtain porous silica particles; (S3) subjecting the porous silica particles to the first heat-treatment to obtain porous silica particles having an Al acid site introduced therein; (S4) impregnating the pores of the porous silica particles having the Al acid site introduced therein with a carbon precursor and then subjecting it to the second heat treatment to obtain a carbon-silica composite; and (S5) etching the silica in the carbon-silica composite to obtain porous carbon.

The hydrate for introducing the Al acid site may be aluminum chloride hexahydrate.

The first heat treatment may be performed by raising the temperature to 500° C. to 600° C. at a rate of 0.5° C./min to 3° C./min.

The carbon precursor may be at least one selected from the group consisting of furfuryl alcohol, sucrose and glucose.

The second heat treatment may be carried out at 70° C. to 100° C. for 7 hours to 10 hours.

After the second heat treatment, the method may further comprise a step of raising the temperature at a rate of 0.5° C./min to 3° C./min under an inert atmosphere, and then performing the third heat treatment at 700° C. to 1000° C. for 1 hour to 5 hours.

The etching solution used in the etching may be a solution comprising at least one selected from the group consisting of hydrofluoric acid (HF), hydrogen peroxide ($H_2O_2$), nitric acid ($HNO_3$) and potassium hydroxide (KOH).

The present invention also provides a porous carbon, and a positive electrode active material comprising a sulfur-containing material carried within pores of the porous carbon.

The content of sulfur carried in the porous carbon may be 50 to 80 wt. % based on the total weight of the positive electrode active material.

The present invention also provides a method for preparing a positive electrode active material, comprising the steps of: (P1) forming a mixed powder of the porous carbon and a sulfur-containing material; (P2) mixing the mixed powder with a solvent for dissolving sulfur to form a mixture; and (P3) subjecting the mixture to heat treatment under vacuum to impregnate the pores of the porous carbon with sulfur.

The solvent for dissolving sulfur may be at least one selected from the group consisting of $CS_2$, ethylenediamine, acetone and ethanol.

The present invention also provides a positive electrode for a lithium secondary battery comprising the positive electrode active material.

The present invention also provides a lithium secondary battery comprising the positive electrode.

Advantageous Effects

Since the porous carbon according to the present invention comprises micropores and mesopores having different sizes, when the porous carbon is applied as a positive electrode material for a lithium secondary battery, for example, a lithium-sulfur secondary battery, the specific surface area is improved by the micropores, and thus the battery performance may be improved and the energy density of the battery may be improved by increasing the loading of sulfur by the mesopores. In addition, since the mesopores provide a sufficient pore volume, it is possible to maximize the participation of sulfur in the oxidation and reduction reaction by providing a space capable of facilitating the entry and exit of the electrolyte solution while carrying the sulfur.

In addition, since the porous carbon according to the present invention has a uniform spherical shape and a uniform size, when applied as a positive electrode active material for a lithium-sulfur secondary battery, the porous carbon may improve the packing density of the positive electrode active material on the current collector to improve the energy density of the battery.

DESCRIPTION OF DRAWINGS

FIGS. 1a and 1b are SEM (scanning electron microscope) photographs of porous silica synthesized in Preparation Example 1.

FIGS. 2a to 2c are SEM (scanning electron microscope) and TEM (transmission electron microscope) photographs of the porous silica prepared in Preparation Example 1.

FIGS. 3a to 3d are graphs of the isotherm linear plot and the pore diameter distribution as a result of nitrogen adsorption/desorption analysis of the porous carbon according to Examples 1 to 4, respectively.

FIG. 3e are SEM (scanning electron microscope) and TEM (transmission electron microscope) photographs of the porous silica according to Example 5.

FIG. 4 is a graph showing the results of nitrogen adsorption/desorption analysis on the porous carbon of Example 1 and the activated carbon of Comparative Example 1.

FIG. 5 is a graph showing voltage profiles depending on capacities in lithium-sulfur secondary batteries of Example 1 and Comparative Example 1.

FIG. 6 is a graph showing the results of galvanostatic charging-discharging analysis for lithium-sulfur secondary batteries of Example 1 and Comparative Example 1.

FIG. 7 is a graph showing discharging capacity of the lithium-sulfur secondary batteries of Example 1 and Comparative Example 1 depending on the number of cycles during high-rate discharging.

BEST MODE

Hereinafter, the present invention will be described in detail in order to facilitate understanding of the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

Porous Carbon

The present invention relates to a porous carbon which may be used as a positive electrode material for a lithium secondary battery.

The porous carbon according to the present invention comprises micropores and mesopores having different sizes and is characterized by having a uniform particle size and shape.

In the present invention, the porous carbon comprises micropores and mesopores having different sizes. Hereinafter, the size of the pores comprised in the porous carbon means the diameter of the pores.

The micropores not only increase the specific surface area of the porous carbon but also have an effect of carrying sulfur and thus inhibiting the release of poly sulfide. The diameter of the micropores may be 1 nm to 8 nm. If the diameter of the micropore is less than the above range, the pores are excessively small, so that the pore may be easily clogged in the sulfur bearing process. If the diameter of the micropore is larger than the above range, the effect of increasing the specific surface area of the porous carbon may be insignificant.

Since the mesopore is larger in pore size than the micropore and may play a sulfur bearing role capable of carrying more sulfur, the mesopore may improve the energy density of the battery by increasing the sulfur content in the positive electrode of the lithium secondary battery, for example, the lithium-sulfur secondary battery. Also, due to the mesopore, the entry and exit of the electrolyte solution in the positive electrode of the lithium-sulfur secondary battery is facilitated and the leaching issue of poly sulfide may be improved by adsorption.

The mesopore may have a diameter of 20 nm to 40 nm. If the diameter of the mesopore is less than the above range, the loading of the sulfur in the mesopore is reduced, the entry and exit of the electrolyte solution is not easy, the space for adsorbing the poly sulfide is insufficient, and thus the leaching issue of the poly sulfide cannot be solved. If the diameter of the mesopore exceeds the above range, the pore size becomes excessively large, and thus the leaching issue of the polysulfide in the positive electrode becomes serious, and the durability of the electrode may be reduced.

Also, the pore volume of the mesopore may be 3.5 $cm^2/g$ or more, preferably 3.5 $cm^2/g$ to 4.5 $cm^2/g$, and more preferably 3.8 $cm^2/g$ to 4.2 $cm^2/g$. If the volume of the mesopore is less than the above range, the loading of the sulfur in the pores is reduced, and the effect of improving the energy density of the battery is insignificant. If the volume of the mesopore exceeds the above range, the loading of sulfur is improved to increase the sulfur content in the electrode and thus improve the energy density, but the mechanical strength of the carbon structure is relatively decreased, and the durability of the sulfur-carbon composite and the electrode may be deteriorated during the slurry preparing process.

In the porous carbon according to the present invention, the micropore and the mesopore may be contained at a pore volume ratio of 1:20 to 70, preferably 1:30 to 60, more preferably 1:40 to 50. If the pore volume ratio of the mesopores to the micropores is less than the above range, the specific surface area may be improved, the loading of the sulfur is reduced, and this the effect of improving the energy density of the battery is insignificant. If the pore volume ratio of the mesopore to the micropore exceeds the range, the loading of sulfur is increased, but the proportion of mesopores is relatively high and thus the specific surface area may be reduced.

The specific surface area of the porous carbon according to the present invention may range from 1000 $m^2/g$ to 1300 $m^2/g$, preferably from 1150 $m^2/g$ to 1300 $m^2/g$, and more preferably from 1200 $m^2/g$ to 1300 $m^2/g$. If the specific surface area of the porous carbon is less than the above range, the discharging capacity may be lowered. If the specific surface area of the porous carbon is more than the above range, the case is a case when there are relatively many micro pores, and thus the loading of sulfur may be reduced and the energy density of the battery may be reduced.

Also, since the porous carbon has a uniform shape and size, when applied as a material for a positive electrode material, for example, a positive electrode active material, the packing density of the positive electrode active material on the current collector may be improved.

Specifically, the porous carbon has a spherical uniform shape and has a uniform size with a particle diameter of 2 μm to 10 μm, preferably 3 μm to 7 μm, more preferably 4 μm to 6 μm. If the particle diameter of the porous carbon is less than the above range, the loading of the sulfur may be reduced. If the particle diameter of the porous carbon exceeds the above range, the packing density of the positive electrode active material on the current collector may be lowered.

Preparing Method of Porous Carbon

The present invention also relates to a method for preparing a porous carbon which may be used as a positive electrode material for a lithium secondary battery, comprising the steps of (S1) dissolving porous silica in an organic solvent and mixing with aluminum chloride hexahydrate to prepare a solution of the porous silica; (S2) evaporating an organic solvent in the porous silica solution to obtain porous silica particles; (S3) subjecting the porous silica particles to the first heat-treatment to obtain porous silica particles having an Al acid site introduced therein; (S4) impregnating the pores of the porous silica particles having the Al acid site introduced therein with a carbon precursor and then subjecting it to the second heat treatment to obtain a carbon-silica composite; and (S5) etching the silica in the carbon-silica composite to obtain porous carbon.

Hereinafter, the method for preparing the porous carbon according to the present invention will be described in more detail for each step.

Step (S1)

In step (S1), a porous silica solution may be prepared by dissolving a porous silica in an organic solvent and mixing it with a hydrate for introducing an Al acid site.

In the present invention, the porous silica plays a role of a template for synthesizing the porous carbon. When porous silica having a particle size of 2 μm to 10 μm is used, it may be advantageous to synthesize porous carbon having uniform shape and size.

The organic solvent may be at least one selected from the group consisting of ethanol, methanol, propanol, butanol, ethyl acetate, chloroform, and hexane and is not limited as long as it is an organic solvent capable of dissolving porous silica.

The hydrate for introducing the Al acid site may be aluminum chloride hexahydrate and is used to introduce the Al acid site into the porous silica.

The porous silica solution in step (S1) may be prepared by using 1 to 5 parts by weight of the porous silica and 0.21 to 1.05 parts by weight of the hydrate for introducing the Al acid site, relative to 100 parts by weight of the organic solvent.

If the amount of the porous silica is less than 1 part by weight, the yield of porous carbon produced is lowered and the relative ratio of the acid sites is increased, and thus there may be a restriction on the carbonization reaction. If the amount of the porous silica exceeds 5 parts by weight, the relative ratio of the acid sites may be lowered and thus the polymerization of the carbon precursor for the synthesis reaction of the porous carbon may be difficult to proceed.

If the amount of the hydrate for introducing the Al acid site is less than 0.21 part by weight, the acid sites introduced into the porous silica may be insufficient, and thus the polymerization reaction of the carbon precursor in porous carbon synthesis process may be difficult to proceed. If the amount of the hydrate for introducing the Al acid site exceeds 1.05 parts by weight, the acid site is rather excessive and thus the synthesis reaction of the porous carbon may be difficult to proceed.

Step (S2)

In step (S2), porous silica particles may be obtained by evaporating the organic solvent in the porous silica solution.

By evaporating the organic solvent while stirring the porous silica solution at room temperature, residual porous silica particles may be obtained.

Step (S3)

In step (S3), the porous silica particles may be subjected to the first heat treatment to obtain porous silica particles having an Al acid site introduced therein.

The Al acid site is located on the surface of silica to induce polymerization reaction of a carbon precursor such as furfuryl alcohol and plays a role in promoting the synthesis of porous carbon.

The first heat treatment may be performed by raising the temperature to 500 to 600° C. at a rate of 0.5° C./min to 3° C./min in an air atmosphere.

If the rate of temperature rise during the first heat treatment is less than 0.5° C./min, the time required for heat treatment becomes longer, and thus the physical properties of the porous silica particles may be denatured. If the rate of temperature rise exceeds 3° C./min, the acid sites may not be formed as much as desired in the porous silica particles.

If the temperature of the first heat treatment is less than 500° C., the acid sites may not be formed as much as desired in the porous silica particles. If the temperature of the first heat treatment exceeds 600° C., the physical properties of the porous silica particle may be denatured.

Step (S4)

In step (S4), a carbon-silica composite may be obtained by impregnating the porous silica particles having the Al acid site introduced therein with a carbon precursor and then subjecting it to the second heat treatment.

At this time, the carbon precursor may be impregnated into the pores of the porous silica particles in the form of a solution.

In the present invention, the carbon precursor may be at least one selected from the group consisting of furfuryl alcohol, sucrose, and glucose.

In the present invention, since the carbon precursor in a liquid phase is used as the carbon precursor, a separate solvent for dissolving the carbon precursor may not be required. However, the carbon precursor as the liquid phase may be further dissolved in the solvent. At this time, the solvent used in the solution of the carbon precursor may be tetraethylene glycol dimethyl ether (TEGME).

The solution of the carbon precursor may be prepared by mixing the carbon precursor and the solvent at a weight ratio of 1:0.5 to 1.5. If the weight ratio of the solvent to the carbon precursor is 1:less than 0.5, since the amount of the carbon precursor is relatively high, the wall thickness of the pore may be increased and thus the pore volume of the mesoporous carbon which is a product may be reduced. On the other hand, if the weight ratio is 1:more than 1.5, the amount of carbon precursor contained in the solution may be small and thus the wall thickness of the pores may be reduced and it may be difficult to maintain the shape of the mesoporous carbon.

Therefore, the volume of the micropores and mesopores may be controlled by tetraethylene glycol dimethyl ether, a solvent for further dissolving the carbon precursor in the liquid phase.

In the present invention, the second heat treatment is a process for inducing polymerization of a carbon precursor wherein a carbon-silica composite can be obtained by the second heat treatment.

The temperature of the second heat treatment may be 70° C. to 100° C., preferably 75° C. to 95° C., more preferably ° C. to 90° C. If the temperature of the second heat treatment is less than the above range, the polymerization reaction rate of the carbon precursor is not fast or is not properly initiated. If the temperature of the second heat treatment exceeds the above range, the physical properties of the formed carbon-silica composite may be denatured.

The time period of the second heat treatment may be 7 hours to 10 hours, preferably 7.5 hours to 9.5 hours, more preferably 8 hours to 9 hours. If the time period of the second heat treatment is less than the above range, the polymerization reaction of the carbon precursor may not be completely completed. If the time period of the second heat treatment exceeds the above range, the excess time period does not significantly affect the outcome of the reaction and thus there is no benefit arising from exceeding the time period of heat treatment.

Also, if the heat treatment is performed within the range of the temperature and the time period of the heat treatment specified as the condition for the second heat treatment, the uniformity of shape and size of the porous carbon produced may be improved.

Also, in the present invention, the method may further comprise the third heat treatment step performed by raising the temperature at a rate of 0.5° C./min to 1° C./min under an inert atmosphere after the second heat treatment and heat-treating at 700° C. to 1000° C. for 1 hour to 5 hours.

The inert atmosphere may be formed by at least one inert gas selected from the group consisting of argon, nitrogen, helium, neon, and krypton. When argon among the inert gases is used, the reaction from which the carbon-silica composite is formed may be performed more smoothly. Therefore, it may be preferable that the inert atmosphere is formed of argon among the inert gases.

If the rate of temperature rise during the third heat treatment is less than 0.5° C./min, the carbon-silica composite is incompletely formed. If the heating rate exceeds 1° C./min, there may be a problem that affects the overall porous structure.

If the temperature of the third heat treatment is less than 700° C., the carbon-silica composite is incompletely formed. If the temperature of the third heat treatment exceeds 1000° C., the physical properties of the formed carbon-silica may be denatured.

Also, if the heat treatment is performed within the ranges of the temperature raising rate, and the temperature and the time period of the heat treatment specified as the condition for the third heat treatment, the uniformity of shape and size of the porous carbon produced may be further improved.

Step (S5)

In step (S5), porous carbon may be obtained by etching the silica in the carbon-silica composite.

At this time, the carbon-silica composite may be dispersed in a mixed solution of an organic solvent and water, and the silica may be etched using an etching solution.

Considering the dispersibility of the carbon-silica composite, the organic solvent and water may be mixed in a weight ratio of 1:0.8 to 1.2. The organic solvent may be at least one selected from the group consisting of ethanol, methanol, propanol, butanol, ethyl acetate, chloroform and hexane.

The etching solution may be a solution containing at least one selected from the group consisting of hydrofluoric acid (HF), hydrogen peroxide ($H_2O_2$), nitric acid ($HNO_3$), potassium hydroxide (KOH) and sodium hydroxide (NaOH).

Positive Electrode Active Material

The present invention also relates to a positive electrode active material comprising a porous carbon; and a sulfur-containing material carried within the pores of the porous carbon wherein the positive electrode active material may be for a lithium secondary battery. Preferably, the positive electrode active material may be a positive electrode active material for a lithium-sulfur secondary battery.

The sulfur-containing active material may be at least one selected from the group consisting of elemental sulfur ($S_8$) and sulfur-based compounds. Specifically, the sulfur-based compound may be selected from $Li_2Sn$ ($n \geq 1$), an organic sulfur compound or a carbon-sulfur polymer (($C_2S_x)_n$: $2.5 \leq x \leq 50$, $n \geq 2$).

The content of sulfur may be 50 to 80 wt. %, preferably 65 to 77 wt. %, based on the total weight of the positive electrode active material. If the content of sulfur is less than 50 wt. %, the energy density of the battery may be lowered. If the amount of sulfur is more than 80 wt. %, the volume expansion of sulfur and low electric conductivity during charging/discharging may be problems.

Preparation Method of Positive Electrode Active Material

The present invention also provides a method for preparing a positive electrode active material as described above, comprising the steps of: (P1) forming a mixed powder of the porous carbon and sulfur or a sulfur compound; (P2) mixing the mixed powder with a solvent for dissolving sulfur to form a mixture; and (P3) subjecting the mixture to heat treatment under vacuum to impregnate the pores of the porous carbon with sulfur.

Hereinafter, a method of preparing a positive electrode active material according to the present invention will be described in more detail for each step.

Step (P1)

The porous carbon for preparing the positive electrode active material may be prepared by the process for preparing the porous carbon comprising the steps (S1) to (S5) as described above. The sulfur may comprise elemental sulfur ($S_8$), a sulfur-based compound or a mixture thereof. Specifically, the sulfur-based compound may be $Li_2Sn$ ($n \geq 1$), an organic sulfur compound or a carbon-sulfur polymer (($C_2S_x)_n$: $2.5 \leq x \leq 50$, $n \geq 2$).

The porous carbon and sulfur may be mixed in a powder state to obtain a mixed powder. At this time, the porous carbon and sulfur may be mixed such that the weight of sulfur is 50 to 80 wt. %, preferably 65 to 77 wt. %, based on the total weight of the positive electrode active material to be produced.

Step (P2)

The mixed powder obtained in step (P1) is mixed with a solvent to form a mixture, wherein the sulfur contained in the mixed powder may be dissolved by using a solvent for dissolving sulfur having a high sulfur solubility as the solvent so that the dissolved liquid sulfur is carried in the pores of the porous carbon.

At this time, the solvent for dissolving sulfur may be at least one selected from the group consisting of $CS_2$ solvent, ethylenediamine, acetone, and ethanol. In particular, when the $CS_2$ solvent is used, the selective solubility of sulfur contained in the mixed powder is high, so that it is advantageous to dissolve sulfur to be carried in the inside of pores contained in the porous carbon.

Step (P3)

The mixture formed in step (P2) may be subjected to heat treatment in a vacuum to fix the liquid sulfur carried in the pores contained in the porous carbon to the surface of the pores.

A positive electrode active material having a shape, in which sulfur is carried in the porous carbon, may be prepared by steps (P1) to (P3). The positive electrode active material may be applied to a positive electrode of a lithium-sulfur secondary battery.

Positive Electrode and Lithium Secondary Battery

The present invention also relates to a positive electrode comprising the positive electrode active material as described above and a lithium secondary battery comprising said positive electrode.

The positive electrode may comprise a positive electrode current collector and a positive electrode active material layer disposed on the positive electrode current collector and comprising the positive electrode active material and optionally a conductive material and a binder.

As the positive electrode current collector, specifically it may be preferable to use foamed aluminum, foamed nickel, or the like having excellent conductivity.

In addition, the positive electrode active material layer may further comprise a conductive material for allowing electrons to move smoothly in the positive electrode together with the positive electrode active material, and a binder for enhancing adhesion between the positive electrode active materials or between the positive electrode active material and the current collector.

The conductive material may be carbon-based materials such as carbon black, acetylene black, and ketjen black; a conductive polymer such as polyaniline, polythiophene, polyacetylene, polypyrrole and may be comprised in an amount of 5 to 20 wt. % based on the total weight of the positive electrode active material layer. If the content of the conductive material is less than 5 wt. %, the effect of improving the conductivity by the use of the conductive material is insignificant. On the other hand, if the content of the conductive material exceeds 20 wt. %, the content of the positive electrode active material becomes relatively small, and thus there is a possibility that the capacity characteristics may be deteriorated.

In addition, the binder may be poly(vinyl acetate), polyvinylalcohol, polyethyleneoxide, polyvinylpyrrolidone, alkylated polyethyleneoxide, cross-linked polyethyleneoxide, polyvinylether, poly(methylmethacrylate), polyvinylidene fluoride, copolymer of polyhexafluoropropylene and polyvinylidene fluoride (product name: Kynar), poly (ethylacrylate), polytetrafluoroethylene, polyvinylchloride, polyacrylonitrile, polyvinylpyridine, polystyrene, and derivatives, blends and copolymers thereof and the like. Also, the binder may be preferably comprised in an amount of 5 to 20 wt. % based on the total weight of the positive electrode active material layer. If the content of the binder is less than 5 wt. %, the effect of improving the adhesion between the positive electrode active materials or between the positive electrode active material and the current collector depending on the use of the binder is insufficient. On the other hand, if the content of the binder exceeds 20 wt. %, the content of the positive electrode active material becomes relatively small, and thus there is a possibility that the capacity characteristics may be deteriorated.

The positive electrode as described above may be prepared by a conventional method, and specifically, may be prepared by applying the composition for forming the positive electrode active material layer prepared by mixing the positive electrode active material, the conductive material and the binder in an organic solvent, on a current collector, followed by drying and optionally rolling.

At this time, the organic solvent may be a solvent which may uniformly disperse the positive electrode active material, the binder, and the conductive material, and which is easily evaporated. Specifically, the organic solvent may comprise acetonitrile, methanol, ethanol, tetrahydrofuran, water, isopropyl alcohol and the like.

The lithium secondary battery comprising the positive electrode comprising the porous carbon according to the present invention may increase the density of the positive electrode because the porous carbon has a uniform size and shape. Preferably, the lithium secondary battery may be a lithium-sulfur secondary battery.

In addition, when compared with activated carbon having only micropores, since the porous carbon has micropores, thereby having a high specific surface area and also has mesopores, thereby having a large pore volume, the pores are not clogged even after the impregnation of sulfur, and thus the electrolyte solution is easy to enter and exit, and as a result, the discharging capacity and the output characteristic are excellent.

Hereinafter, preferred examples will be presented to facilitate understanding of the present invention. It should be understood, however, that the following examples are illustrative of the present invention and that various changes and modifications may be made within the scope and spirit of the present invention, and it is obvious that such changes and modifications are within the scope of the appended claims.

Preparation Example 1: Synthesis of Porous Silica 8.0 g of a triple block copolymer $EO_{20}PO_{70}EO_{20}$ (trade name: Pluronic P123, EO: ethylene glycol, PO: propylene glycol), 10 g of potassium chloride (KCl) and 20 mL of 37.2 wt. % hydrochloric acid (HCl) were mixed with 130 mL of water and 10 mL of ethanol, and the mixture was stirred at room temperature for 8 hours or more. Next, when Pluronic P123 was completely dissolved, 9.26 mL of mesitylene was added and stirred at 40° C. for 2 hours.

18.4 mL of tetraethylorthosilicate (TEOS), a silica source, was added and stirred vigorously at the same temperature for 2 minutes. The mixed solution was kept at the same temperature for 20 hours. Thereafter, 0.092 g of ammonium fluoride was added to the mixed solution, stirred vigorously for 2 minutes, and then hydrothermally synthesized in an oven at 100° C. for 24 hours. Then, the mixture was filtered with a mixture of ethanol and water, dried at room temperature, and heat-treated at 550° C. for 4 hours in an air atmosphere to finally synthesize porous silica.

FIGS. 1a and 1b are SEM (scanning electron microscope) photographs of porous silica synthesized in Preparation Example 1.

Referring to FIG. 1a, it can be seen that a porous silica having a spherical particle shape and mesopore was produced.

In addition, FIG. 1B is an enlarged photograph of FIG. 1a. It can be seen that the diameter of the prepared porous silica is 5 μm, and mesopore is well developed.

Example 1: Preparation of Porous Carbon, Positive Electrode Active Material, Positive Electrode and Lithium-Sulfur Secondary Battery (1) Preparation of Porous Carbon 1 g of spherical porous silica prepared in Preparation Example 1 was uniformly dispersed in 50 ml of ethanol and 0.21 g of aluminum chloride hexahydrate was mixed together and stirred for 2 hours to obtain a porous silica solution.

While the porous silica solution was stirred at room temperature, all of the solvent ethanol was evaporated.

Thereafter, the remaining powder of porous silica particles was collected, heated at 1° C./min in an air atmosphere to raise the temperature to 550 □ and thus subjected to the first heat treatment and maintained for 5 hours.

After the first heat treatment, the pore volume of the porous silica with the introduced Al acid site was measured, furfuryl alcohol as much as ½ volume of the measured pore volume and tetraethylene glycol dimethyl ether (TEGDME) as much as ½ volume of the measured pore volume were mixed and impregnated using a vacuum. That is, the weight ratio of furfuryl alcohol as a carbon precursor and tetraethylene glycol dimethyl ether as a solvent is 1:1.

After that, the mixture was maintained in an oven at 80 □ for 8 hours to perform the second heat treatment to induce polymerization of furfuryl alcohol.

In addition, the temperature was raised at a rate of 1 □/min in an Ar atmosphere to raise the temperature to 850 □ and maintained for 3 hours to prepare a carbon-silica composite.

The carbon silica composite was dispersed in a mixed solution of ethanol and water at a weight ratio of 1:1, and silica was etched with HF to prepare porous carbon.

(2) Preparation of Positive Electrode Active Material

The prepared porous carbon was mixed with sulfur powder to obtain a mixed powder. At this time, the mixed powder was prepared so that the weight of sulfur in the positive electrode active material to be produced could be 70 wt. %.

Sulfur contained in the mixed powder was dissolved while dropping CS2 as a solvent for dissolving sulfur into the mixed powder.

The mixed powder in which sulfur was dissolved was kept under vacuum for 30 minutes and then held at 155 □ for 12 hours to fix the dissolved sulfur to the inner pores of the porous carbon to produce a positive electrode active material.

(3) Manufacture of Lithium-Sulfur Secondary Battery

A positive electrode mixture of 80 wt. % of the positive electrode active material, 10 wt. % of carbon black (conductive material) and 10 wt. % of PVDF (binder) was added to N-methyl-2-pyrrolidone (NMP) as a solvent to prepare a positive electrode slurry, and then the slurry was coated on the current collector of the aluminum foil to prepare a positive electrode. At this time, the content of sulfur in the positive electrode is 2.3 mg/d.

A lithium-sulfur secondary battery was manufactured by using the lithium foil with a thickness of 200 μm as a negative electrode, an organic solution obtained by dissolving 2 wt. % LiNO$_3$ additive in 1M LiTFSI (DME/DOL, 1:1 volume ratio) as the electrolyte solution, and the polypropylene film as a separator.

LiTFSI: Bis(trifluoromethane) sulfonamide lithium salt

DME: Dimethoxymethane

DOL: 1,3-dioxolane

Example 2

The same procedure as in Example 1 was carried out, except that after the first heat treatment, furfuryl alcohol and tetraethylene glycol dimethyl ether in a weight ratio of 1:0.67 were impregnated into the pores of the porous silica with the introduced Al acid site, and the pore volume of the porous silica was measured and then impregnated as much as the measured pore volume.

Example 3

The same procedure as in Example 1 was carried out, except that after the first heat treatment, furfuryl alcohol and tetraethylene glycol dimethyl ether in a weight ratio of 1:0.43 were impregnated into the pores of the porous silica with the introduced Al acid site, and the pore volume of the porous silica was measured and then impregnated as much as the measured pore volume.

Example 4

The same procedure as in Example 1 was carried out, except that after the first heat treatment, furfuryl alcohol and tetraethylene glycol dimethyl ether in a weight ratio of 1:0.25 were impregnated into the pores of the porous silica with the introduced Al acid site, and the pore volume of the porous silica was measured and then impregnated as much as the measured pore volume.

Example 5

The same procedure as in Example 1 was carried out, except that after the first heat treatment, furfuryl alcohol and tetraethylene glycol dimethyl ether in a weight ratio of 1:2.33 were impregnated into the pores of the porous silica with the introduced Al acid site, and the pore volume of the porous silica was measured and then impregnated as much as the measured pore volume.

Comparative Example 1: Activated Carbon

Activated carbon (MSP-20, Kanto chemical Co.) containing micropores alone was prepared.

The same procedure as in Example 1 was carried out, except that a positive electrode active material, a positive electrode, and a lithium-sulfur secondary battery were manufactured using the activated carbon instead of the porous carbon.

Experimental Example 1: Observation of Porous Carbon

The shape, size and pore of the porous carbon prepared in Example 1 were observed.

FIGS. 2a to 2c are SEM (scanning electron microscope) and TEM (transmission electron microscope) photographs of the porous silica prepared in Preparation Example 1.

FIG. 2a is a SEM photograph of the porous carbon prepared in Example 1, which shows that spherical porous carbon was overall synthesized.

FIG. 2b is an enlarged SEM photograph of the porous carbon prepared in Example 1, which shows that the particle size of the spherical porous carbon is 5 μm.

FIG. 2c is a TEM photograph of the porous carbon prepared in Example 1, which shows that a well-developed porous carbon with mesopores was synthesized.

Experimental Example 2: Measurement of Physical Properties of Porous Carbon and Activated Carbon In order to compare the surface area, pore volume and pore size of the porous carbon of Example 1 and the activated carbon of Comparative Example 1, nitrogen adsorption/desorption experiments were carried out.

Nitrogen adsorption/desorption experiments were carried out using the equipment (Tristar II 3020, Micromeritics) for measuring specific surface area. Specifically, the sample to be analyzed (about 50 mg to 100 mg) was placed in a glass tube for analysis and a pretreatment process was performed by removing the moisture adsorbed in the pores of the sample to be analyzed for 8 hours at 100 □ in a vacuum state. Nitrogen adsorption/desorption analysis was performed on the pretreated sample while flowing nitrogen gas using liquid nitrogen.

FIGS. 3a to 3d are graphs of the isotherm linear plot and the pore diameter distribution as a result of nitrogen adsorption/desorption analysis of the porous carbon according to Examples 1 to 4, respectively, and FIG. 3e are SEM (scanning electron microscope) and TEM (transmission electron microscope) photographs of the porous silica according to Example 5.

Referring to FIGS. 3a to 3e, it can be seen that the specific surface area and pore volume of the porous carbon of Examples 1 to 3 are relatively good, and in the case of Example 5, the weight ratio of furfuryl alcohol as a carbon precursor and tetraethylene glycol dimethyl ether as a solvent is so high that porous carbon may not maintain its spherical shape.

FIG. 4 is a graph showing the results of nitrogen adsorption/desorption analysis on the porous carbon of Example 1 and the activated carbon of Comparative Example 1.

Referring to FIG. 4 and Table 1 below, it can be seen that the porous carbon of Example 1 contains both micropores and mesopores, and thus the specific surface area is slightly smaller than the activated carbon of Comparative Example 1 but does not differ greatly, and the pore volume is about 4 times that of the activated carbon.

TABLE 1

|  | Carbon precursor:solvent (furfuryl alcohol:TEGDME) | Specific surface area | Pore volume | Pore diameter |
| --- | --- | --- | --- | --- |
| Example 1 | 1:1 | 1,267 m$^2$/g | 3.7 cm$^3$/g | 4 nm, 30 nm |
| Example 2 | 1:0.67 | 1,147 m$^2$/g | 3.4 cm$^3$/g | 4 nm, 21 nm |

TABLE 1-continued

| | Carbon precursor:solvent (furfuryl alcohol:TEGDME) | Specific surface area | Pore volume | Pore diameter |
|---|---|---|---|---|
| Example 3 | 1:0.43 | 1,022 m²/g | 2.5 cm³/g | 3.8 nm, 29 nm |
| Example 4 | 1:0.25 | 1,013 m²/g | 2.1 cm³/g | 3.8 nm, 31 nm |
| Example 5 | 1:2.33 | Impossible to maintain spherical shape | | |
| Comparative Example 1 | — | 1,943 m²/g | 0.9 cm³/g | 2 nm or less |

Experimental Example 2: Experiment of Discharging Capacity

The discharging capacity of the lithium-sulfur secondary battery containing the porous carbon of Example 1 and the activated carbon of Comparative Example 1 was analyzed in the first cycle of charging/discharging by analyzing the voltage profile. The discharging capacity was determined by a constant current test (galvanostatic test) at 1 C rate of 1672 mA/g and a constant current test at 0.2 C rate.

FIG. 5 is a graph showing voltage profiles depending on capacities in lithium-sulfur secondary batteries of Example 1 and Comparative Example 1.

Referring to FIG. 5, the porous carbon of Example 1 is different from the activated carbon of Comparative Example 1 in that it contains porous carbon with the formed mesopores, and it can be seen that the porous carbon of Example 1 has a relatively small specific surface area, but the pore volume is relatively large due to the presence of mesopores, and as a result, the discharge capacity may be increased due to the fact that sulfur may be efficiently carried in pores.

Experimental Example 3: Life Test of Battery

In order to confirm whether or not the life characteristics of the lithium-sulfur secondary battery were improved by mitigating the leaching issue of poly sulfide in electrochemical reduction reaction of sulfur by the porous carbon containing micropores and mesopores and having a uniform shape and size and whether or not the efficiency of carrying sulfur was improved due to the increased pore volume and the reversible capacity was improved, galvanostatic charging-discharging analysis was performed. The galvanostatic charging-discharging analysis was carried out at 0.2 C in 1.7 V to 3.0 V voltage range (vs Li/Li⁺) (1 C: 1672 mA/g).

FIG. 6 is a graph showing the results of galvanostatic charging-discharging analysis for lithium-sulfur secondary batteries of Example 1 and Comparative Example 1.

Referring to FIG. 6, it can be seen that the lithium-sulfur secondary battery of Example 1, which comprises the positive electrode material containing the porous carbon containing micropores and mesopores, is superior in battery life to Comparative Example 1 and has an additional capacity of about 200 mAh/g.

Experimental Example 4: Experiment of High Rate Characteristics

High rate characteristics of the lithium-sulfur secondary battery in Example 1 and Comparative Example 1 were experimented by cycling 5 times for each density while sequentially changing the charging/discharging densities to 0.1 C, 0.2 C, 0.5 C, 1 C and 5 C.

FIG. 7 is a graph showing discharging capacity of the lithium-sulfur secondary batteries of Example 1 and Comparative Example 1 depending on the number of cycles during high-rate discharging.

Referring to FIG. 7, it was confirmed that Example 1 shows higher retention capacity at high rate discharging than Comparative Example 1, and that since the porous carbon of Example 1 comprises mesopores, the rapid entry and exit of the electrolyte solution is possible, the generation and decomposition of the discharging product in the pore is performed based on the high pore volume, and thus the leaching of poly sulfide was controlled and the capacity expression at high rate was excellent.

Although the present invention has been described with reference to the exemplary embodiments and drawings, it is to be understood that the present invention is not limited thereto and that various modifications and variations are possible within the scope of the technical idea of the present invention and the equivalents of the claims to be described below by a person having ordinary skill in the art to which the present invention pertains.

The invention claimed is:

1. A positive electrode for a lithium secondary battery comprising porous carbon particles, wherein the porous carbon particles comprise micropores having a diameter of 1 nm to 8 nm and mesopores having a diameter of 2 nm to 50 nm,
wherein the porous carbon particles are spherical particles having a particle diameter of 2 μm to 10 μm, and
wherein the porous carbon comprises the micropores and the mesopores in a pore volume ratio of 1:40 to 50.

2. The positive electrode according to claim 1, wherein the porous carbon particles comprise micropores having a diameter of 0.1 nm to 1.8 nm.

3. The positive electrode according to claim 1, wherein the porous carbon particles comprise micropores having a diameter of 0.3 nm to 1.5 nm.

4. The positive electrode according to claim 1, wherein the porous carbon particles comprise mesopores having a diameter of 10 nm to 50 nm.

5. The positive electrode according to claim 1, wherein the porous carbon particles comprise mesopores having a diameter of 30 nm to 50 nm.

6. The positive electrode according to claim 1, wherein the porous carbon particles comprise mesopores having a diameter of 20 nm to 40 nm.

7. The positive electrode according to claim 1, wherein the porous carbon particles are spherical particles having a particle diameter of 3 μm to 7 μm.

8. The positive electrode according to claim 1, wherein the porous carbon particles are spherical particles having a particle diameter of 4 μm to 6 μm.

9. The positive electrode according to claim 1, wherein the pore volume of mesopores is 3.5 cm²/g or more.

10. The positive electrode according to claim 1, wherein the pore volume of mesopores is 3.5 cm²/g to 4.5 cm²/g.

11. The positive electrode according to claim 1, wherein the pore volume of mesopores is 3.8 cm²/g to 4.2 cm²/g.

12. The positive electrode according to claim 1, wherein the specific surface area of the porous carbon is 1000 m²/g to 1300 m²/g.

13. The positive electrode according to claim 1, wherein the specific surface area of the porous carbon is 1150 m²/g to 1300 m²/g.

14. The positive electrode according to claim 1, wherein the specific surface area of the porous carbon is 1200 $m^2/g$ to 1300 $m^2/g$.

15. A lithium secondary battery comprising the positive electrode according to claim 1.

* * * * *